UNITED STATES PATENT OFFICE.

MAX HENRY ISLER, OF MANNHEIM, AND HUGO WOLFF, OF LUDWIGSHAFEN-ON-THE-RHINE, GERMANY, ASSIGNORS TO BADISCHE ANILIN & SODA FABRIK, OF LUDWIGS-HAFEN-ON-THE-RHINE, GERMANY, A CORPORATION.

ANTHRACENE COMPOUND AND PROCESS OF MAKING IT.

961,612.                  Specification of Letters Patent.     Patented June 14, 1910.

No Drawing.         Application filed February 16, 1909. Serial No. 478,313.

*To all whom it may concern:*

Be it known that we, MAX HENRY ISLER, chemist, and HUGO WOLFF, doctor of philosophy and chemist, being respectively a citizen of the Swiss Republic and a subject of the Grand Duke of Baden, and residing at Mannheim and Ludwigshafen-on-the-Rhine, Germany, respectively, have invented new and useful Improvements in Anthracene Compounds and Processes of Making Them, of which the following is a specification.

In the specification of Letters Patent No. 863,397 is described the production of coloring matters of the anthraquinone series, namely, those in which three anthraquinone groups are joined together by means of nitrogen, and these compounds are there termed dianthraquinonyl - diamino - anthraquinone compounds. The said patent claims generically these new compounds and a process of making them. In the present application we make no generic claim to such products or the process of making them, but we wish to describe and claim specifically certain compounds and the process of making such compounds which are not specifically described in the said Letters Patent.

We have descovered that coloring matters which are not specifically described in the aforesaid Letters Patent are obtained by condensing beta - beta - dihalogen-anthraquinone with a 1-amino-anthraquinone derivative which is substituted in the ring not containing the amino group by a substituent which does not react with, that is to say, is neutral with respect to, the dihalogen - anthraquinone employed, or by condensing alpha - alpha - diamino - anthraquinone with a beta - halogen - anthraquinone derivative which is substituted in the ring not containing the halogen atom by a substituent which does not react with, that is to say, is neutral with respect to, the alpha - alpha - diamino-anthraquinone employed, (for the purposes of this invention these processes are equivalent). Or, we can condense 1 - amino - 6 - halogen - anthraquinone, or 1-amino-7-halogen-anthraquinone, either with itself or with one another, and hereby also obtain similar compounds, and for the purposes of this invention these processes are equivalent.

As instances of the substituted 1-amino-anthraquinone and beta-halogen-anthraquinone compounds which we can employ according to our invention, we mention for instance 1-amino-6-halogen-anthraquinone, 1-amino - 7 - halogen - anthraquinone, and also those containing either the NH.R, the NR$_2$, the OH, or the OR group (where R represents either an alkyl, or an aryl, group), and also those derivatives of 1-amino-anthraquinone to which an additional ring (for instance the pyridin ring) has been joined.

In particular, in this application we desire to be understood as claiming the production of coloring matters by condensing beta-beta-dihalogen-anthraquinone with 1-amino-beta-halogen-anthraquinone in which the amino group and the halogen atom are attached to different rings of the anthraquinone residue, such as 1-amino-6-chlor-anthraquinone and 1 - amino - 7 - chlor - anthraquinone. The coloring matters so produced possess the generic properties of the coloring matters claimed in the aforesaid Patent No. 863397, that is to say, in the unsulfonated form they are insoluble in water and in dilute acids and alkalies, difficultly soluble in most organic solvents, soluble in concentrated sulfuric acid yielding greenish solutions, which solutions upon warming turn bluer, and are also soluble in alkaline hydrosulfite solutions yielding yellowish red to brown-red vats, dyeing cotton substantially red shades.

The new coloring matters obtained by condensing beta-beta-dihalogen-anthraquinone with 1-amino-beta-halogen-anthraquinone in which the amino group and the halogen atom are attached to different rings of the anthraquinone residue can be distinguished from the coloring matters specifically claimed in the aforesaid specification in that the said new coloring matters possess a composition corresponding to the presence of two atoms of halogen in the molecule, *i. e.*, if the chlorin derivatives be employed, the coloring matters produced contain, in the pure state, over nine per cent. of chlorin, or, if the bromin derivatives be employed, the coloring matters contain over nineteen per cent. of bromin.

The following examples will serve to illustrate further the nature of our invention and how it can be carried into practical effect, but our invention is not confined to these examples. The parts are by weight.

Example 1. Boil together for from four to eight hours, fifteen parts of 1-amino-6-chlor-anthraquinone, one hundred and fifty parts of nitrobenzene, four parts of calcined sodium carbonate and three-tenths of a part of copper oxid. When the melt is cold, filter off the coloring matter and wash it with alcohol. It can be obtained in the form of a paste by dissolving it in concentrated sulfuric acid, precipitating by means of water, and filtering. In a similar manner, coloring matter can be obtained from 1-amino-7-chlor-anthraquinone, or from a mixture of 1-amino-6-chlor-anthraquinone with 1-amino-7-chlor-anthraquinone.

Example 2: Boil together twenty-six parts of 1-amino-6-chlor-anthraquinone, twelve parts of 1.5-diamino-anthraquinone, four hundred parts of nitrobenzene, eleven parts of calcined sodium carbonate, and four-fifths of a part of copper oxid. When the formation of coloring matter is complete, work up the product as described in the foregoing Example 1.

Example 3: Boil together twenty-six parts of 1-amino-6-chlor-anthraquinone, fourteen parts of 2.6-dichlor-anthraquinone, four hundred parts of nitrobenzene, eleven parts of calcined sodium carbonate, and four-fifths of a part of copper oxid. When the formation of coloring matter is complete, work up the product as described in the foregoing Example 1.

Example 4: Boil together five and three-fifths parts of 2.6-dichlor-anthraquinone, ten parts of 1-amino-6-methyl-amino-anthraquinone, one hundred and sixty parts of nitrobenzene, two-fifths of a part of copper oxid and four parts of calcined soda. When the formation of the coloring matter is complete, allow the mass to cool, and filter off the coloring matter and wash it with alcohol. In this example, 2.7-dichlor-anthraquinone can be employed instead of 2.6-dichlor-anthraquinone, and, instead of 1-amino-6-methyl-amino-anthraquinone, other derivatives can be used, such as 1-amino-7-alkyl-amino-anthraquinone, 1-amino-6-hydroxy-anthraquinone (obtainable by reducing the sodium salt of 1-nitro-6-anthraquinone sulfonic acid and then replacing the sulfonic acid group by hydroxyl), and 1-amino-anthraquinone-6.5-quinolin (containing the nitrogen of the pyridin ring attached to the carbon atom in position 6 of the anthraquinone residue).

Example 5: Boil together twelve parts of 1.5 - diamino - anthraquinone, twenty - seven parts of 2-chlor - 5-methyl - amino - anthraquinone, four hundred parts of nitrobenzene, one part of copper oxid, and ten parts of calcined soda, and work up the product as described in the foregoing example. In this fifth example, 1.8 - diamino - anthraquinone can be employed instead of 1.5-diamino - anthraquinone, and, instead of 2 - chlor - 5 - methyl - amino-anthraquinone, other derivatives can be used, such as 8 - methyl - amino-2-chlor-anthraquinone, 5-hydroxy-2-chlor-anthraquinone (obtainable by boiling diazotized 5 - amino - 2 - chlor-anthraquinone), 8-hydroxy-2-chlor-anthraquinone, 8 - methoxy-2-chlor - anthraquinone, 5 - dimethylamino - 2 - chlor - anthraquinone (obtainable from 2-chlor - 5 - nitro - anthraquinone by means of dimethylamin), 8-dialkyl - amino - 2 - chlor - anthraquinone, 5-nitro-2-chlor-anthraquinone, 8-nitro-2-chlor-anthraquinone, 5-acetamino-2-chlor-anthraquinone, and 8-acetamino-2-chlor-anthraquinone.

In the foregoing examples, other indifferent solvents can be employed instead of nitrobenzene, and the copper oxid can be replaced by metallic copper, or by a copper salt, and calcined soda can be replaced by calcium hydrate, sodium acetate, or potassium carbonate.

The following table gives some properties of some of the coloring matters obtainable according to this invention:

| Condensation product from: | Solution in: | | | Dyes cotton from hydrosulfite vat: |
| --- | --- | --- | --- | --- |
| | Boiling nitrobenzene. | Conc. sulfuric acid. | Conc. sulfuric acid+boric acid. | |
| 1-amino-6-chloranthraquinone with itself | Yellow-red | Olive-green | Blue-violet | Bordeaux red. |
| 1-amino-7-chloranthraquinone with itself | Brown-red | Green | Violet-blue | Yellow-red. |
| 1-amino-6-chloranthraquinone+1-amino-7-chlor-anthraquinone | Yellow-red | do | do | Yellowish red. |
| 1-amino-6-chloranthraquinone+1.5-diamino-anthraquinone | Yellow-red, (difficultly soluble.) | do | Blue | Bluish red. |
| 1-amino-6-chloranthraquinone+1.8-diamino-anthraquinone | do | do | Reddish blue | Blue-red. |
| 1-amino-7-chloranthraquinone+1.5-diamino-anthraquinone | do | Blue-green | Blue | Yellowish red. |
| 1-amino-7-chloranthraquinone+1.8-diamino-anthraquinone | do | do | Green-blue | do. |
| 1-amino-6-chloranthraquinone+2.6-dichlor-anthraquinone | do | Yellow-green | Violet | Bordeaux red. |
| 1-amino-6-chloranthraquinone+2.7-dichlor-anthraquinone | do | Bottle-green | Blue-violet | do. |
| 1-amino-7-chloranthraquinone+2.6-dichlor-anthraquinone | Yellow-red, (more easily soluble.) | Bluish green | Blue | Yellow-red. |
| 1-amino-7-chloranthraquinone+2.7-dichlor-anthraquinone | do | do | do | do. |

Now what we claim is:

1. The process of producing coloring matters of the anthracene series by condensing beta-beta-dihalogen-anthraquinone with a 1-amino-anthraquinone derivative which is substituted in the ring different to that containing the amino group by a substituent which is neutral with respect to the dihalogen-anthraquinone employed substantially as described.

2. The process of producing coloring matters of the anthracene series by condensing 1-amino - 6 - halogen-anthraquinone with alpha-amino-beta-halogen-anthraquinone substantially as described.

3. The process of producing coloring matters of the anthracene series by condensing 1-amino-6-halogen-anthraquinone with itself substantially as described.

4. The process of producing coloring matters of the anthracene series by condensing beta-beta-dihalogen-anthraquinone with 1-amino-beta-halogen-anthraquinone in which the amino group and the halogen atom are attached to different rings of the anthraquinone residue substantially as described.

5. The process of producing coloring matters of the anthracene series by condensing beta-beta - dichlor - anthraquinone with 1-amino-beta-chlor-anthraquinone in which the amino group and the halogen atom are attached to different rings of the anthraquinone residue substantially as described.

6. The process of producing coloring matters of the anthracene series by condensing one molecular proportion of 2.6-dichlor-anthraquinone with two molecular proportions of 1.6-amino-chlor-anthraquinone substantially as described.

7. As new articles of manufacture dihalogenated dianthraquinonyl-diamino-anthraquinone compounds which in the unsulfonated form are insoluble in water and in dilute acids and alkalies, difficultly soluble in most organic solvents, soluble in concentrated sulfuric acid yielding greenish solutions which solutions upon warming turn bluer, and are also soluble in alkaline hydrosulfite solutions yielding yellowish red to brown-red vats dyeing cotton substantively red shades, and which contain more than nine per cent. of halogen.

8. As new articles of manufacture dichlorinated dianthraquinonyl - diamino - anthraquinone compounds which can be obtained by condensing one molecular proportion of 2.6-dichlor-anthraquinone with two molecular proportions of 1.6-amino-chlor-anthraquinone, which in the unsulfonated form are insoluble in water and in dilute acids and alkalies, difficultly soluble in most organic solvents, soluble in concentrated sulfuric acid yielding greenish solutions which solutions upon warming turn bluer, and are also soluble in alkaline hydrosulfite solutions yielding yellowish red to brown - red vats dyeing cotton substantively red shades, and which contain more than nine per cent. of chlorin.

In testimony whereof we have hereunto set our hands in the presence of two subscribing witnesses.

MAX HENRY ISLER.
HUGO WOLFF.

Witnesses:
J. ALEC. LLOYD,
JOS. H. LEUTE.